Nov. 23, 1965 SABURO UEMURA 3,219,763

BOUNDARY-DISPLACEMENT TYPE MAGNETIC OSCILLOGRAPH

Filed Sept. 25, 1959

Inventor
Saburo Uemura by Hill, Sherman, Meroni, Gross & Simpson
Attys.

United States Patent Office 3,219,763
Patented Nov. 23, 1965

3,219,763
BOUNDARY-DISPLACEMENT TYPE MAGNETIC OSCILLOGRAPH

Saburo Uemura, Tokyo, Japan, assignor of three-fourths to Sony Corporation (Sony Kabushikikaisha), Tokyo, Japan, a corporation of Japan Filed Sept. 25, 1959, Ser. No. 842,357
Claims priority, application Japan, Oct. 6, 1958, 33/28,559
7 Claims. (Cl. 179—100.2)

This invention relates to a magnetic oscillograph and more particularly to such an oscillograph which is made based upon the principle of the boundary-displacement magnetic recording.

It has been heretofore known that visible oscillographic records are obtained, if magnetic powder is attached to the magnetic records on a magnetic medium made by the boundary-displacement magnetic recording. Such an apparatus, however, has a disadvantage that clear contour of the record cannot be obtained on the boundary region which is less inclined or parallel to the longitudinal saturation of the magnetic medium.

A principal object of this invention is to provide a boundary-displacement type magnetic oscillograph in which very clearly visible oscillographic records are obtained on the boundary region when putting magnetic powder on the same.

Another object of this invention is to provide a boundary-displacement type magnetic oscillograph in which much clear contour of the visible oscillographic record is obtained even on the boundary region which is less inclined or parallel to the longitudinal saturation of the magnetic medium.

Other objects, features and advantages of this invention will become apparent to those skilled in the art from the following detailed disclosure in connection with the accompanying drawing in which, FIGS. 1A–D show diagrammatic representation for illustrating the operation of a boundary-displacement type magnetic oscillograph according to this invention.

Figures 2, 3:
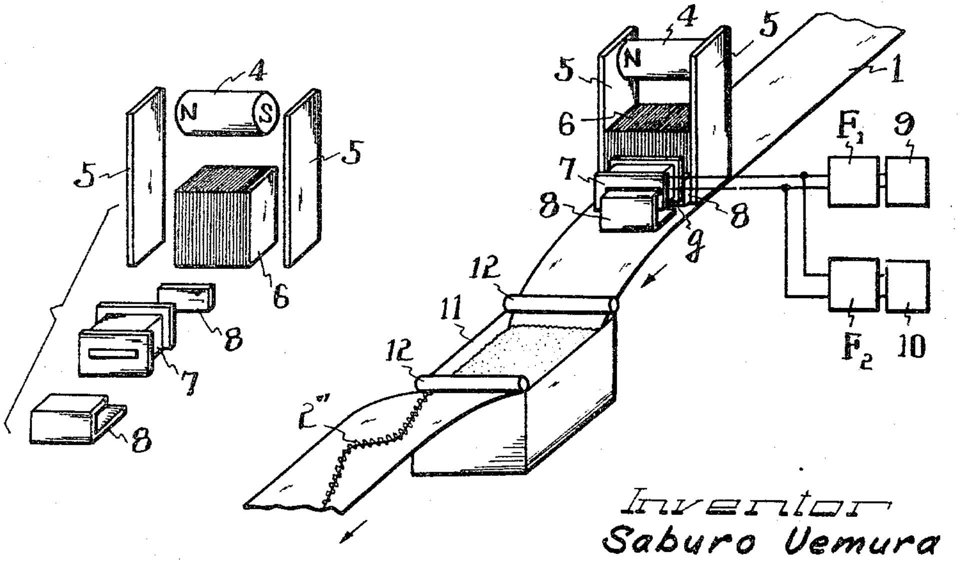

FIG. 2 is a perspective view of a boundary-displacement type magnetic oscillograph, by way of example, according to this invention, and FIG. 3 is a fragmental perspective view of a magnetic head operating in accordance with the boundary-displacement magnetic recording.

Figure 1:
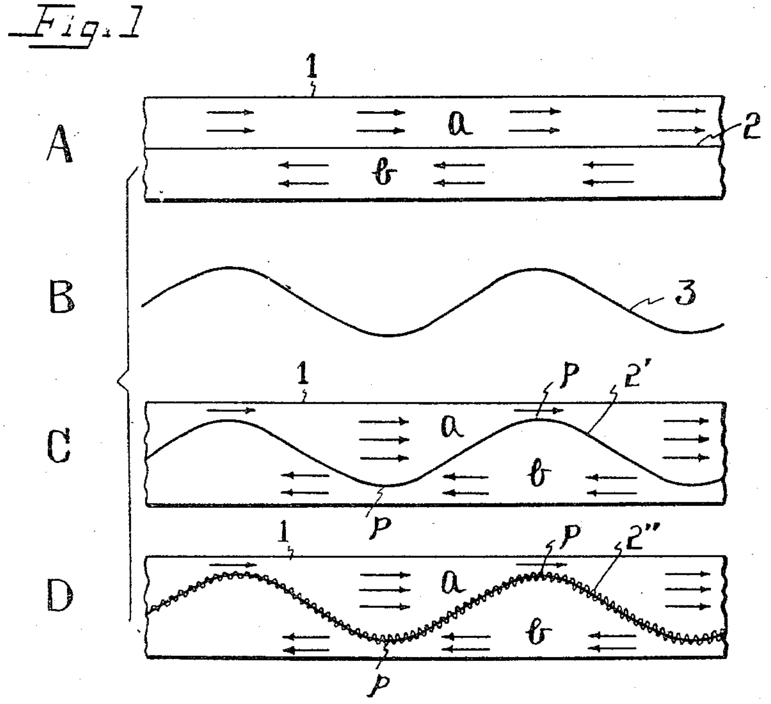

Referring to FIG. 1, 1 is a magnetic medium or magnetic tape. Now when the boundary-displacement magnetic recording is applied to the magnetic tape, the upper half part *a* of the tape is positively saturated as shown by the arrow, for instance, and the lower half part *b* thereof negatively saturated as shown by the opposite arrow, and the midpoint or the boundary region 2 between the two saturated parts is parallel to the longitudinal saturation of the tape, in the case of absence of a signal.

If, however, a signal 3 shown in FIG. 1–B is applied to the boundary-displacement magnetic recording apparatus the boundary region 2 is transversely displaced in proportion to the amplitude of the recording signal, which produces a record 2′ as shown in FIG. 1–C, the upper part of the magnetic tape from the record 2′ being biased in the positive saturation and the lower part thereof in the negative saturation. This is so-called a boundary-displacement magnetic recording.

If magnetic powder is contacted onto the surface of the magnetic tape 1 thus recorded, for example, by passing the magnetic tape through a suspension of carbonyl iron powder in alcohol, the wave form is displayed due to the fact that the magnetic powder is attached on only the boundary region 2′ or the recorded signal.

In the case of absence of a signal, however, the boundary region 2 is parallel to the longitudinal saturation of the magnetic tape 1 as shown in FIG. 1–A, the boundary region has no residual magnetization on the surface of the magnetic tape so that the trace of the record cannot attract the magnetic powder to display the contour of the wave form.

In accordance with this invention an alternating current having any desired frequency and amplitude as hereinafter referred to which can be called an auxiliary alternating current is applied to a boundary-displacement magnetic recording head besides the signal current to be recorded.

FIG. 3 shows a fragmental perspective view of one example of boundary displacement magnetic recording heads and FIG. 2 shows a boundary-displacement magnetic oscillograph used by the recording head shown in FIG. 3, in which 4 is a permanent magnet, 5 represents its yoke, 6 a lamination stack. 7 designates a head coil which is connected to a signal source 9 to be recorded and to an auxiliary alternating current source 10.

Thus the coil is energized with the superimposition of the both output currents. But separate coils may be provided and respectively connected to the sources 9 and 10. 8 are cores which forms an operation air gap *g*.

In using the boundary-displacement type magnetic recording head the air gap *g* and the permanent magnet 4 are disposed perpendicularly with respect to the advance direction of the magnetic tape or longitudinal direction of the tape as shown in FIG. 1 and the center of the air gap is on the midpoint of the width of the tape as shown in FIG. 2. Then the magnetic tape is biased by the direct current magnetic field of the permanent magnet 4 in such a manner that the boundary region 2 is formed on the center line of the tape, the upper region *a* being positively saturated and the lower region *b* negatively saturated as shown in FIG. 1–A. At this condition the coil is energized by the current from the source 9 in the form of the record 3 as shown in FIG. 1–B so that the boundary region 2′ is transversely displaced, as shown in FIG. 1–C, according to the amplitude of the signal.

In addition to this, magnetic recording is now continued by superimposing the auxiliary alternating current from the source 10 to the recording current from the source 9. The frequency of the auxiliary alternating current may be selected as desired, inasmuch as it is higher than that of the recording current. For instance the frequency of the auxiliary alternating current may preferably be selected as highest possible frequency which is limited by the gap width of the head. The amplitude of the auxiliary alternating current may preferably be selected as much smaller than that of the recording current, for instance, as $\frac{1}{10}$–$\frac{1}{50}$ times that of recording current.

It will be preferable that a desired band pass filter $F_1$ which prevents the current from the source 10 from entering into the source 9 is inserted into the output circuit of the source 9 and that a desired band pass filter $F_2$, in turn, which prevents the other frequencies than the higher frequency of the current from the source 10 is inserted into the output circuit of the source 10 in order to prevent the interference between both frequencies of the two sources 9 and 10.

Means for putting magnetic powder onto the boundary region 2' are provided for displaying the records in a visible state.

For this purpose the magnetic tape is led by rollers 12 to pass it through a container 11 in which magnetic powder such as iron powder is kept. It will be appreciated that the boundary region 2'' formed by superimposing the auxiliary alternating current to the recording current is displayed by the magnetic powder put thereon more clearly as shown in FIG. 1–D than in the absence of the auxiliary alternating current.

Because the boundary region 2 which forms the recorded wave contour is emphasized by superimposing the additional residual magnetism established by the auxiliary alternating current on its every point even on the points *p* which are less inclined or parallel to the longitudinal saturation of the magnetic tape or the advance direction thereof and which can, otherwise, scarcely catch magnetic powder as hereinbefore referred to.

As will be understood from the foregoing description this invention has the advantages that magnetic records become visible and are displayed accurately and continuously through the whole wave form, which is greatly different from and more available than the heretofore known recording apparatus having a brown tube, a pen describing recording apparatus or other optical recording apparatus.

While I have explained a particular embodiment of my invention, it will be understood, of course, that I do not wish to be limited thereto since many modifications may be made and I, therefore, contemplate by the appended claims to cover any such modifications as fall within the spirit and scope of my invention.

What is claimed is:

1. A boundary-displacement type magnetic oscillograph comprising means for recording a signal on a relatively moving magnetic medium by the displacement of a saturated magnetization area boundary line transversely to the direction of said relative motion, means for recording, on said boundary line of said same relative moving magnetic medium, an auxiliary alternating current having a much higher frequency and a much lower amplitude than said signal to modify and increase the detectability of said boundary line and means for applying magnetic powder to said modified boundary line.

2. A boundary-displacement type magnetic oscillograph comprising a boundary-displacement type magnetic recording head including a recording coil, for recording a signal on a relatively moving magnetic medium by the displacements transverse to said direction of relative motion of a boundary line between areas of saturated magnetization oppositely directed along said direction of relative motion, a signal current source connected to said coil, a source connected to said coil for an auxiliary alternating current of materially higher frequency and materially lower amplitude than said signal to simultaneously modify and increase the detectability of said boundary line and means for applying magnetic powder to said modified boundary line.

3. A boundary-displacement type magnetic oscillograph comprising a boundary-displacement type magnetic recording head for recording a signal on a relatively moving, magnetic medium by the displacements transverse to said direction of relative motion of a boundary line between areas of saturated magnetization oppositely directed along said direction of relative motion, said head including a biasing permanent magnet, a core having an operating air gap and a recording coil wound on said core, a signal current source connected to said coil, a source connected to said coil for an auxiliary alternating current of materially higher frequency and materially lower amplitude than said signal to simultaneously modify and increase the detectability of said boundary line, a source of magnetic powder, and means for relatively moving said powder source and said magnetic medium along said direction of relative motion to apply magnetic powder to said modified boundary line.

4. In combination with a recording head for recording a signal on a relatively moving magnetic recording medium by the displacements, transverse to said direction of relative motion, of a boundary line between two areas which are substantially saturation magnetized in opposite directions parallel to said direction of relative motion, means to modify and increase the detectable width of said boundary line, especially where it is substantially parallel to said direction of relative motion, by recording, along said signal modulation displaced line, a boundary line following and enhancing, electrical wave of substantially constant amplitude which is sufficiently less than the amplitudes of said signal so as to only increase the apparent and detectable width of said boundary line, said electrical wave having a frequency which is sufficiently higher than the frequencies of said signal to appear as a substantially continuous width in the detection of said enhanced boundary line and means for applying a finely divided magnetic material to said modified boundary line to be retained thereon at least temporarily to supply a signal modulated line which is readily optically detectable in all desired portions thereof including its portions which are substantially parallel to the said direction of relative motion.

5. As an article of manufacture, an optically readable, magnetic record comprising an elongated track on a magnetic recording medium, a boundary line extending along said track between two different areas which are substantially saturation magnetized in opposite directions along said track, said boundary line being wave form displaced across said track in accordance with a useful and optically detectable, recorded signal, said boundary line also being displaced across said track by a wave whose wave length is high relative to said signal modulations and normally optically undetected in use and whose substantially constant amplitude is much smaller than the signal modulations of said boundary line and is normally optically read as an increase in the apparent width of said signal modulated line into a strip, and a readily optically readable strip of optically apparently constant width of finely divided magnetic material on said magnetic medium along and following the signal modulation waves of said boundary line, said strip having its apparent and substantially constant width increased by said low amplitude and short wave length wave, especially where said boundary line is substantially parallel to said elongated track.

6. The method of magnetically recording an optically detectable, line-like strip of a substantially constant and readily detectable width throughout all desired portions thereof comprising simultaneously supplying magnetic flux in opposite directions in two closely adjacent regions to a magnetic recording medium to substantially magnetically saturate said medium, simultaneously relatively moving said regions and said recording medium in substantially the direction of one of said opposite directions to apply a magnetically recorded track along said recording medium, simultaneously signal modulating the relative intensities of said oppositely directed regions of flux to form a lateral displacement modulated and detectable wavy line along said track, also modulating the relative intensities of said oppositely directed regions of flux by a wave whose frequency is high, and whose amplitude is low, relative to said signal modulations to be substantially undetected in normal use, and applying a finely divided magnetic material to said magnetic recording medium along said boundary line to increase its apparent width into a readily optically detectable, line-like strip.

7. A boundary-displacement type magnetic oscillograph comprising means for recording a signal on a relatively moving magnetic medium by the displacement of a saturated magnetization area boundary line transversely to the direction of said relative motion, means for recording on said boundary line of said same relatively moving magnetic medium, an auxiliary alternating current having a much higher frequency and a much lower amplitude than said signal to modify and increase the detectability of said boundary line.

References Cited by the Examiner

UNITED STATES PATENTS

| | | | |
|---|---|---|---|
| 2,743,320 | 4/1956 | Daniels et al. | 179—100.2 |
| 2,822,427 | 2/1958 | Atkinson et al. | 179—100.2 |
| 2,943,908 | 7/1960 | Hanna | 346—74 |

OTHER REFERENCES

Pages 116–120, April 1952, Boundary-Displacement Magnetic Recording, H. L. Daniels; Electronics, vol. 25.

IRVING L. SRAGOW, *Primary Examiner.*

L. MILLER ANDRUS, ROBERT SEGAL, *Examiners.*